(12) United States Patent
Lin et al.

(10) Patent No.: US 7,825,892 B2
(45) Date of Patent: Nov. 2, 2010

(54) LCD BACKLIGHT DRIVING SIGNAL GENERATOR

(75) Inventors: Song-Yi Lin, Taipei (TW); Guo-Kiang Hung, Taipei (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 723 days.

(21) Appl. No.: 11/560,881

(22) Filed: Nov. 17, 2006

(65) Prior Publication Data
US 2007/0268239 A1 Nov. 22, 2007

(30) Foreign Application Priority Data
May 19, 2006 (TW) .............................. 95117755 A

(51) Int. Cl.
*G09G 3/36* (2006.01)
(52) U.S. Cl. .................. 345/102; 345/89; 345/204; 362/612; 362/613; 315/274
(58) Field of Classification Search ............... 345/102, 345/204, 89; 362/612, 613; 315/274; 358/505
See application file for complete search history.

(56) References Cited

U.S. PATENT DOCUMENTS

| | | | |
|---|---|---|---|
| 2003/0067436 A1* | 4/2003 | Hara et al. ................. | 345/102 |
| 2004/0119679 A1* | 6/2004 | Garcia et al. ................ | 345/102 |
| 2005/0007389 A1* | 1/2005 | Kumamoto et al. ......... | 345/690 |
| 2006/0044254 A1* | 3/2006 | Kirk ............................ | 345/102 |
| 2006/0087254 A1* | 4/2006 | Yang et al. ................... | 315/247 |
| 2006/0125773 A1* | 6/2006 | Ichikawa et al. ............ | 345/102 |
| 2006/0152171 A1* | 7/2006 | Kinjou ........................ | 315/274 |
| 2006/0208999 A1* | 9/2006 | Lee et al. ..................... | 345/102 |
| 2006/0232995 A1* | 10/2006 | Wu et al. ..................... | 362/613 |
| 2006/0238485 A1* | 10/2006 | Yang ........................... | 345/102 |
| 2006/0267922 A1* | 11/2006 | Kim ............................ | 345/102 |
| 2007/0103934 A1* | 5/2007 | Keh et al. .................... | 362/612 |
| 2008/0007803 A1* | 1/2008 | Ying et al. ................... | 358/505 |

* cited by examiner

*Primary Examiner*—Amare Mengistu
*Assistant Examiner*—Premal Patel
(74) *Attorney, Agent, or Firm*—WPAT, PC; Justin King

(57) ABSTRACT

The present invention discloses a backlight driving signal generator used in a liquid crystal display (LCD) controller. The backlight driving signal generator is coupled to a backlight driving circuit of the LCD and capable of issuing a first pulse signal and a second pulse signal to control the backlight driving circuit to function accordingly. In a preferred aspect, the backlight signal generator is capable of being adapted for the backlight driving circuit of cold cathode fluorescent lamps (CCFLs) or that of light emitting diodes (LEDs).

16 Claims, 9 Drawing Sheets

LCD BACKLIGHT DRIVING SIGNAL GENERATOR

BACKGROUND OF THE INVENTION

1. Field of the Invention

The present invention generally relates to a backlight driving signal generator and, more particularly, to a backlight driving signal generator used in a liquid crystal display (LCD) controller.

2. Description of the Prior Art

With the rapid development in the flat panel display (FPD) industry, the LCD has become the most popular display media. However, a backlight unit is required to provide a light source in order to display visible images on the screen because the liquid crystal molecules are not luminescent.

Currently, most backlight units comprise cold cathode fluorescent lamps (CCFLs) or light emitting diodes (LEDs) as a backlight source. Cold cathode fluorescent lamps are driven by alternate-current (AC) power so as to prevent non-uniformity of luminance due to clustered gaseous ions caused by direct-current (DC) power. On the other hand, light emitting diodes are driven by DC power without inverting the input power into AC power.

The backlight units are driven in different ways according to the elements used in the backlight units. Therefore, it is crucial to provide an LCD controller capable of controlling the luminance of both cold cathode fluorescent lamps and light emitting diodes.

Generally, the controller for cold cathode fluorescent lamps is not compatible for light emitting diodes, and vice versa. It will bring forth more flexibility and convenience to use an LCD controller capable of controlling the luminance of a backlight unit when the backlight unit is implemented by using either cold cathode fluorescent lamps or light emitting diodes.

SUMMARY OF THE INVENTION

Accordingly, it is the primary object of the present invention to provide a backlight driving signal generator used in an LCD controller. The backlight driving signal generator in the LCD controller outputs a control signal to control the luminance of an LCD that employs either cold cathode fluorescent lamps or light emitting diodes as a backlight unit.

In order to achieve the foregoing object, the present invention provides a backlight driving signal generator used in a liquid crystal display (LCD) controller, the backlight driving signal generator comprising: a first pulse width modulation unit for generating a first pulse signal; and a second pulse width modulation unit for generating a second pulse signal; wherein the backlight driving signal generator is coupled to a backlight driving circuit of an LCD and outputting the first pulse signal and the second pulse signal so as to control the backlight driving circuit; the backlight driving signal generator is capable of being adapted for a driving circuit for cold cathode fluorescent lamps (CCFLs) or a driving circuit for light emitting diodes (LEDs).

In order to achieve the foregoing object, the present invention further provides a backlight driving signal generator used in an LCD controller, the backlight driving signal generator being coupled to a backlight unit of an LCD and adjusting the control over the backlight unit according to whether the backlight unit comprises cold cathode fluorescent lamps or light emitting diodes, the backlight driving signal generator comprising a first signal generating unit, a second signal generating unit and a voltage supply unit. The first signal generating unit for outputting a first pulse signal. The second signal generating unit for outputting a second pulse signal. The voltage supply unit comprising a primary winding for inducing an induced voltage so as to drive the backlight unit, the voltage supply unit adjusting the output power of the induced voltage using the first pulse signal. Preferably, the primary winding comprises a first winding controlled by the first pulse signal and a second winding controlled by the second pulse signal. The second pulse signal is adjusted to be held at a high-voltage level or a low-voltage level.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention discloses a backlight driving signal generator used in a liquid crystal display (LCD) controller and can be exemplified by the preferred embodiments as described hereinafter.

Figure 1:
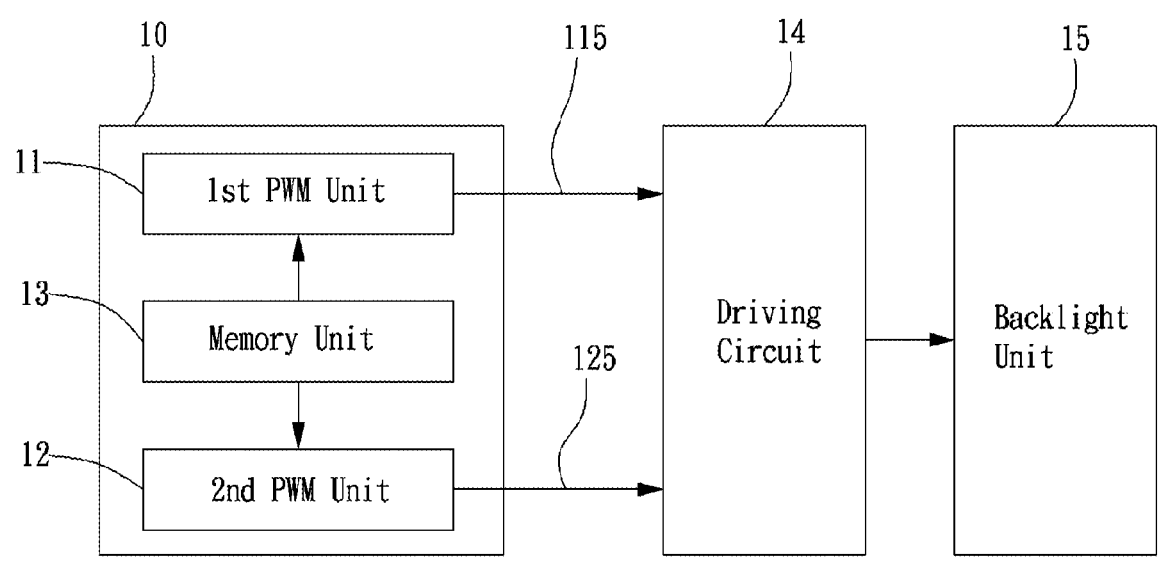
FIG. 1 is a schematic block diagram showing a backlight driving signal generator used in an LCD controller according to one preferred embodiment of the present invention.

Please refer to FIG. 1, which is a schematic block diagram showing a backlight driving signal generator used in an LCD controller according to one preferred embodiment of the present invention. The backlight driving signal generator 10 is installed in an LCD controller (not shown), which can be implemented by using an IC chip. The backlight driving signal generator 10 generates a first pulse signal 115 and a second pulse signal 125 and thus the backlight driving signal generator 10 is composed of a first PWM unit 11 and a second PWM unit 12. In one embodiment, the backlight driving signal generator 10 further comprises a memory unit 13. The first PWM unit 11 generates the first pulse signal 115 and the second PWM unit 12 generates the second pulse signal 125. The memory unit 13 stores a control data so as to control the first pulse signal 115 and the second pulse signal 125. In other words, the first PWM unit 11 determines the amplitude and the pulse width of the first pulse signal 115 according to the control data; and similarly, the second PWM unit 12 determines the amplitude and the pulse width of the second pulse signal 125 according to the control data. The memory 13 can be a data register. The backlight driving signal generator 10 outputs the first pulse signal 115 and the second pulse signal 125 to control the driving circuit 14 and the backlight unit 15 according to the coupled driving circuit 14 and whether the backlight unit 15 comprises cold cathode fluorescent lamps or light emitting diodes.

Figure 2A:
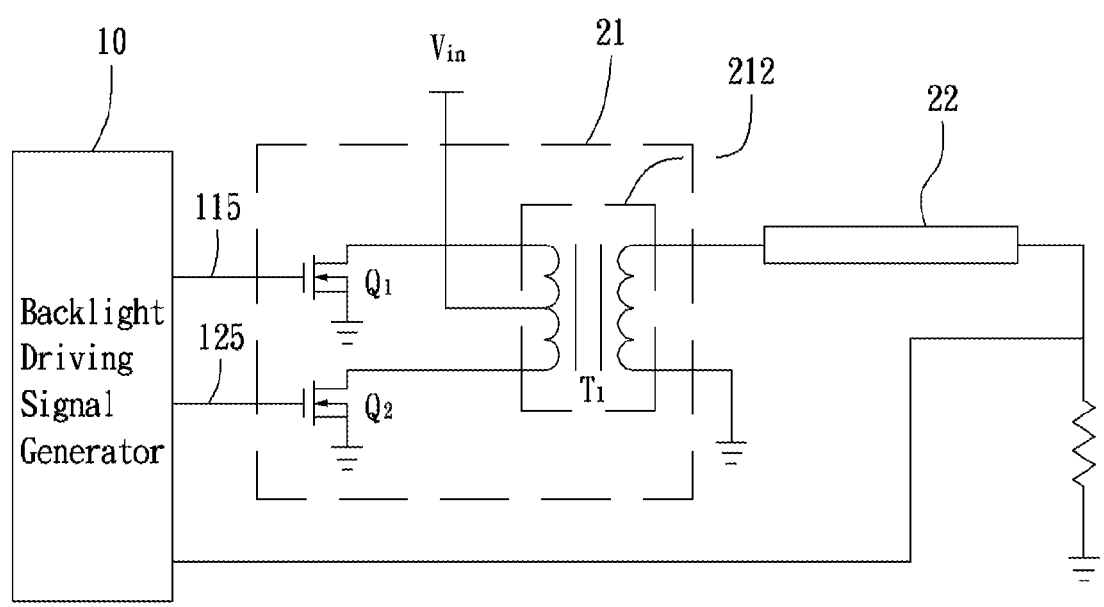
FIG. 2A is a schematic circuit diagram exemplifying a backlight driving signal generator used in an LCD controller where the backlight unit comprises cold cathode fluorescent lamps according to one preferred embodiment of the present invention.

Please refer to FIG. 2A, which is a schematic circuit diagram exemplifying a backlight driving signal generator used in an LCD controller where the backlight unit comprises cold cathode fluorescent lamps according to one preferred embodiment of the present invention. In FIG. 2A, the backlight driving signal generator 10 is coupled to a driving circuit 21 for cold cathode fluorescent lamps 22 and drives the cold cathode fluorescent lamps 22 using the driving circuit 21. The driving circuit 21 is implemented using a push-pull driving circuit, which comprises transistors Q1 and Q2 as electronic switches connected to a voltage transforming circuit 212 so as to provide the voltage sufficient to drive the cold cathode fluorescent lamps 22. The push-pull configuration does not only helps to reduce the cost and enhance the transformer efficiency but is also adapted for receiving a higher DC input voltage Vin. The voltage transforming circuit 212 can be implemented using a transformer T1.

Figure 2B:
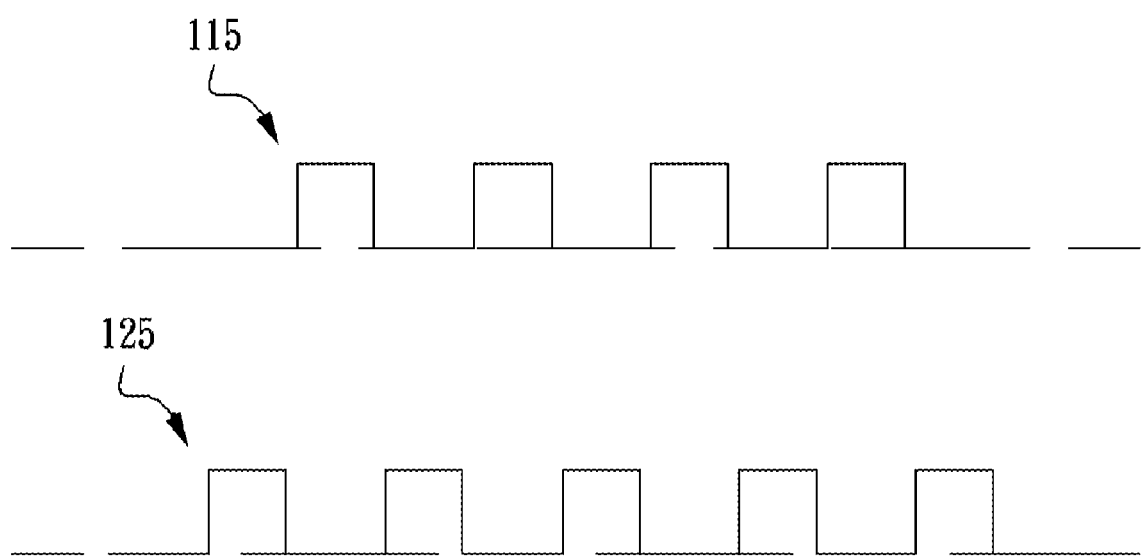
FIG. 2B shows waveforms of the pulse signals from the backlight driving signal generator in FIG. 2A.

The first pulse signal 115 and the second pulse signal 125 from the backlight driving signal generator 10 are at a high-voltage level alternately and not simultaneously so as to prevent the transistors Q1 and Q2 from being turned on at the same time. The driving circuit 21 is controlled by the first pulse signal 115 and the second pulse signal 125 so as to drive the cold cathode fluorescent lamps 22. The waveforms of the first pulse signal 115 and the second pulse signal 125 are as shown in FIG. 2B. The transformer T1 is a voltage supply unit for inducing an induced voltage so as to drive the backlight unit 22. The voltage supply unit adjusts the output power of the induced voltage using the first pulse signal 115 and the second pulse signal 125. In the embodiment as shown in FIG. 2A, the primary winding comprises a first winding controlled by the first pulse signal 115 and a second winding controlled by the second pulse signal 125.

The backlight driving signal generator adapted for the push-pull driving circuit of the present embodiment is only exemplifying the present invention and thus the present invention is not limited thereto. For example, the backlight driving signal generator of the present invention can also be adapted for other CCFL driving circuits, such as a full-bridge driving circuit.

Figure 3A:
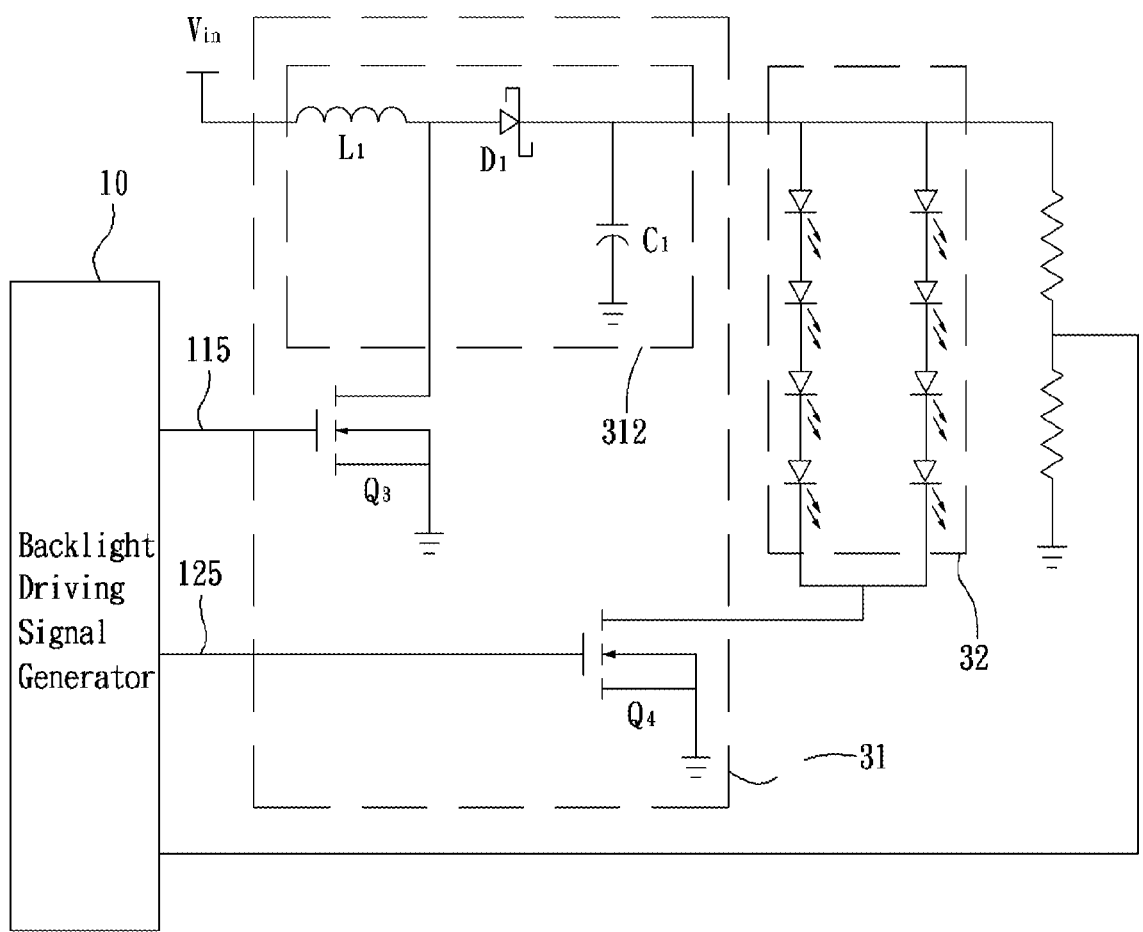
FIG. 3A is a schematic circuit diagram exemplifying a backlight driving signal generator used in an LCD controller where the backlight unit comprises light emitting diodes according to one preferred embodiment of the present invention.

Please refer to FIG. 3A, which is a schematic circuit diagram exemplifying a backlight driving signal generator used in an LCD controller where the backlight unit comprises light emitting diodes according to one preferred embodiment of the present invention. The backlight driving signal generator 10 is coupled to a driving circuit 31 for light-emitting diodes and drives the light-emitting diodes 32 using the driving circuit 31. Since the light-emitting diodes 32 comprise a plurality of light-emitting devices, a higher driving voltage is required for driving. The driving circuit 31 comprises a voltage supply unit 312 composed of a DC-to-DC converter circuit for generating a DC power required for driving the light-emitting diodes 32. The voltage supply unit 312 is implemented using an inductor L1, a diode D1 and a capacitor C1. The voltage supply unit 312 achieves step-up and regulation of the DC input voltage Vin using the transistor Q3 as a switch. The inductor L1 is a winding for inducing an induced voltage. The diode D1 and the capacitor C1 are for one-directional switching and power storage, respectively. The transistors Q3 and Q4 are turned on or off according to the first pulse signal 115 and the second pulse signal 125.

Figure 3B:
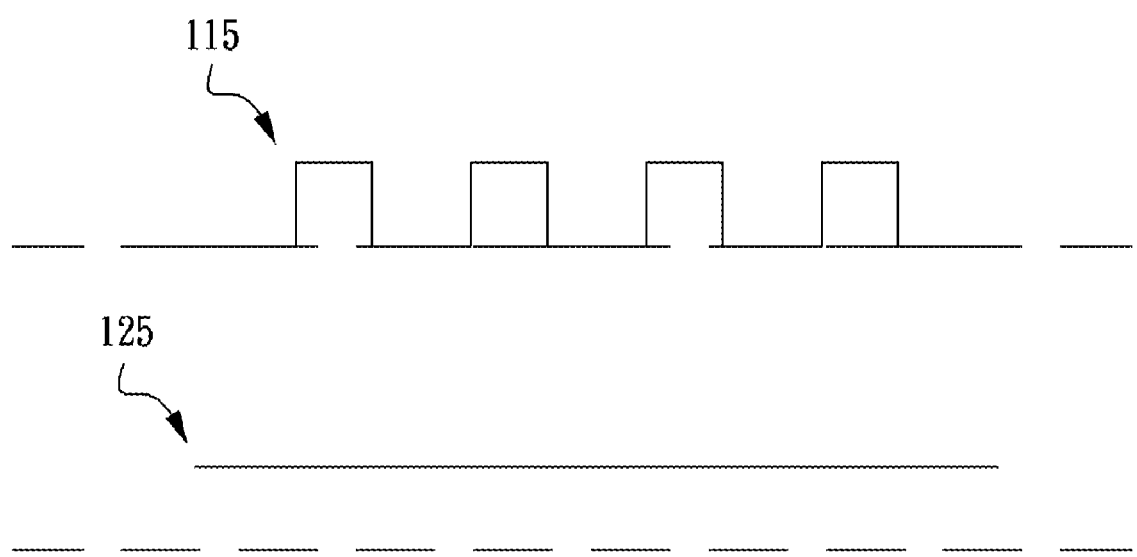
FIG. 3B shows waveforms of the pulse signals from the backlight driving signal generator in FIG. 3A.

The first pulse signal 115 from the backlight driving signal generator 10 is at a high-voltage level periodically and the second pulse signal 125 is held at a high-voltage level. The waveforms of the first pulse signal 115 and the second pulse signal 125 are as shown in FIG. 3B. Moreover, in order to avoid current leakage, the second pulse signal 125 is provided at a low-voltage level so as to open the circuit between the light-emitting diodes 32 and the ground when the light-emitting diodes 32 are turned off. Therefore, the second pulse signal 125 is a switching signal for the light-emitting diodes 32.

Figure 3C:
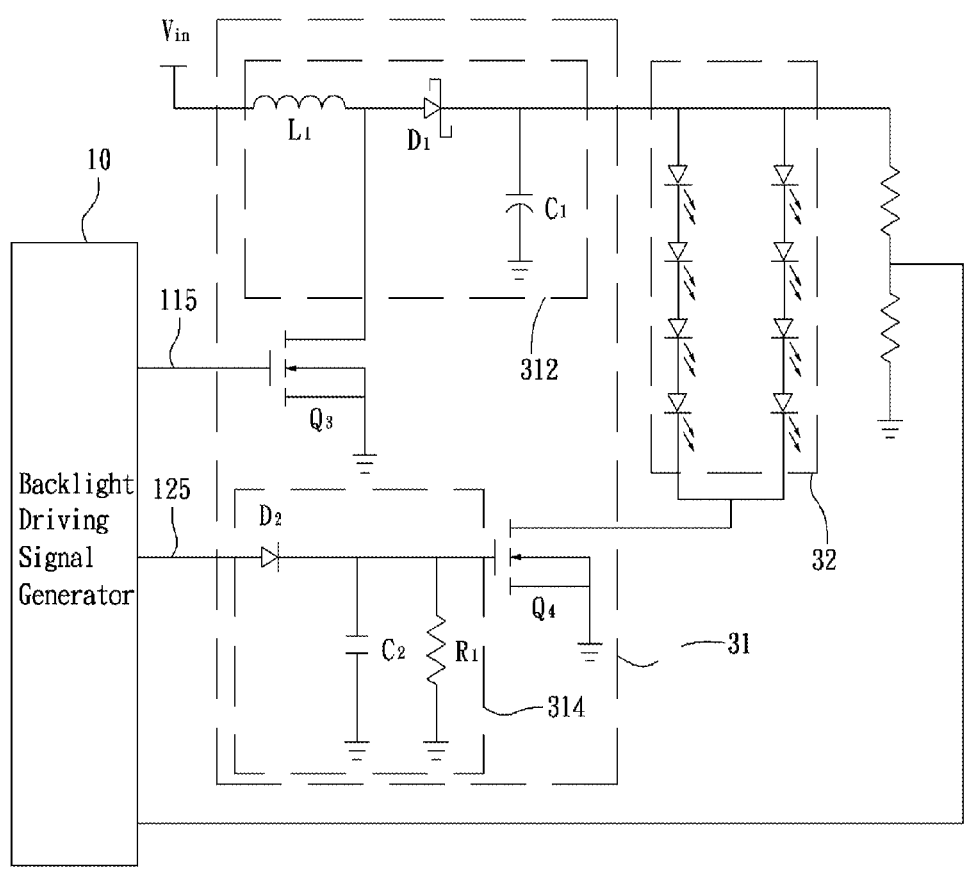
FIG. 3C is a schematic circuit diagram exemplifying another backlight driving signal generator used in an LCD controller where the backlight unit comprises light emitting diodes according to one preferred embodiment of the present invention.
Figure 3D:
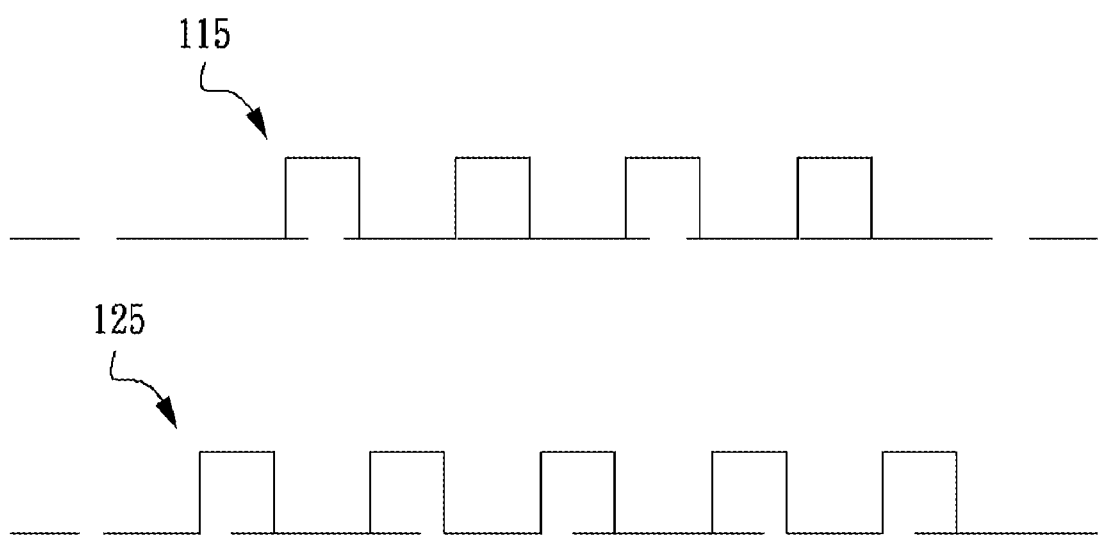
FIG. 3D shows waveforms of the pulse signals from the backlight driving signal generator in FIG. 3C.

Please refer to FIG. 3C, which is a schematic circuit diagram exemplifying another backlight driving signal generator used in an LCD controller where the backlight unit comprises light emitting diodes according to one preferred embodiment of the present invention. The driving circuit 31 comprises a peak detection circuit 314 comprising a diode D2 coupled in series to a capacitor C2 and a resistor R1 coupled in parallel so as to detect the voltage level of the second pulse signal 125. The backlight driving signal generator 10 generates the first pulse signal 115 and the second pulse signal 125 so as to elevate the voltage level and keep the voltage level at high periodically. When the peak detection circuit 314 detects that the second pulse signal 125 is a periodic high-and-low pulse, the charge/discharge of the capacitor C2 and the resistor R1 keeps the second pulse signal 125 at a high-voltage level after the second pulse signal 125 is detected by the peak detection circuit 314. The waveforms of the first pulse signal 115 and the second pulse signal 125 are as shown in FIG. 3D.

Figure 4:
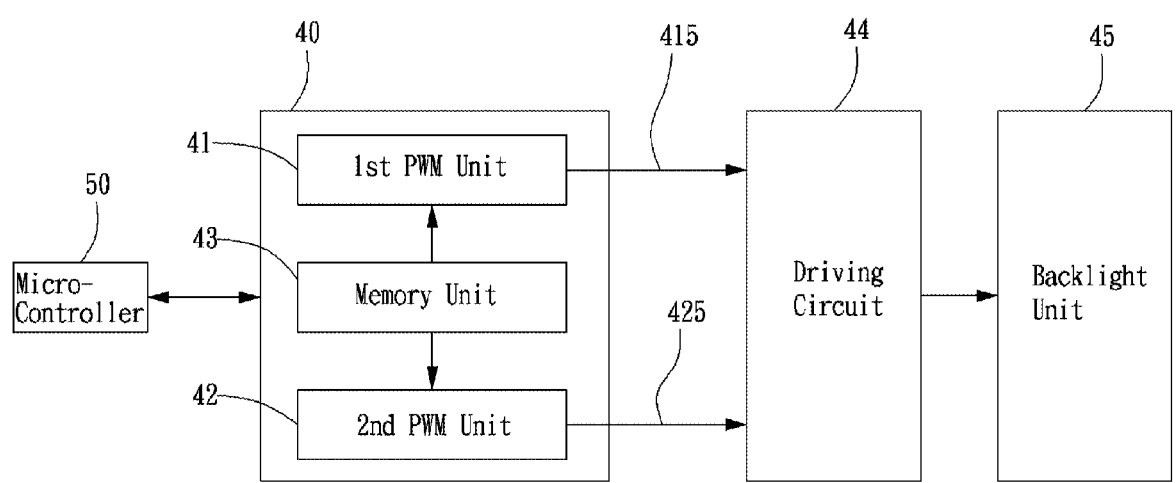
FIG. 4 is a schematic block diagram showing a backlight driving signal generator used in an LCD controller according to another preferred embodiment of the present invention.

Please refer to FIG. 4, which is a schematic block diagram showing a backlight driving signal generator used in an LCD controller according to another preferred embodiment of the present invention. In the present embodiment, the backlight driving signal generator 40 is coupled to a micro-controller 50 for controlling the amplitude and the cycle of a first pulse signal 415 from a first PWM unit 41 and a second pulse signal 425 from a second PWM unit 42 in the backlight driving signal generator 40. In one embodiment, the micro-controller 50 executes a program code (software) so as to control the backlight driving signal generator 40. The program code is stored in an external memory unit (not shown) coupled to the backlight driving signal generator 40 or an internal memory unit 43 inside the backlight driving signal generator 40. The backlight driving signal generator 40 is coupled to a driving circuit 44 and adjusts the pulse signal 415 and the second pulse signal 425 to control the backlight unit 45 according to whether the backlight unit 45 comprises cold cathode fluorescent lamps or light emitting diodes.

Figure 5:
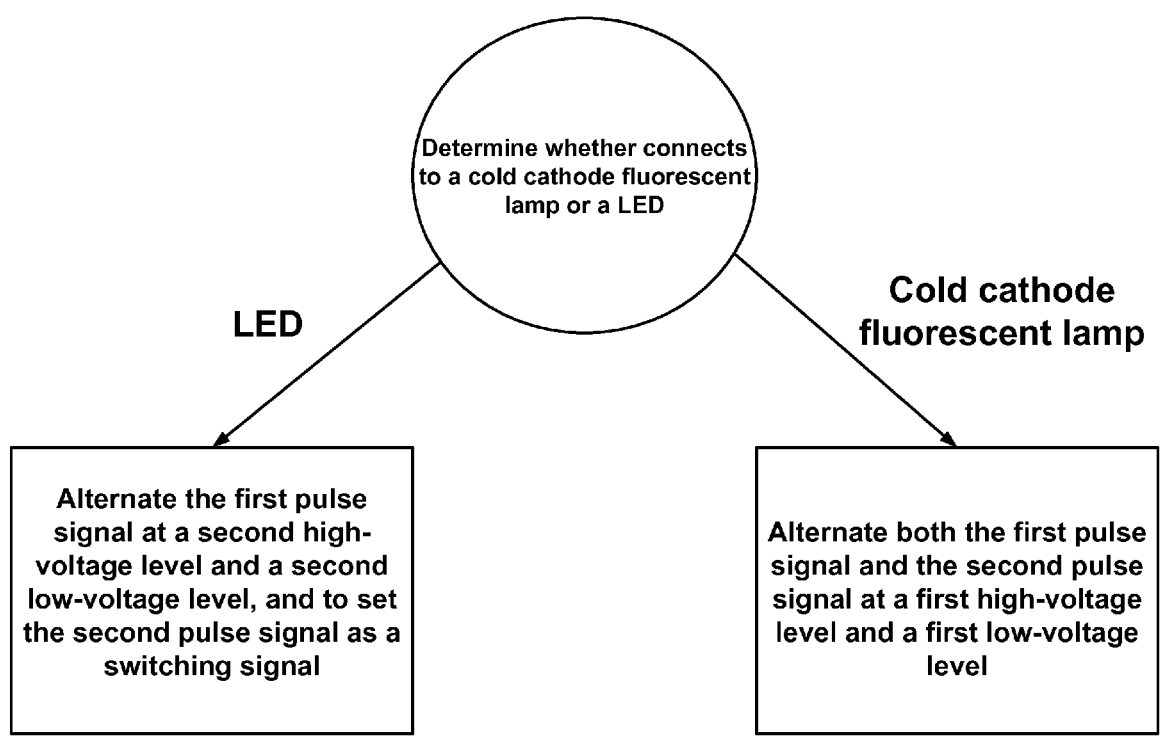
FIG. 5 is a flowchart of a method and process for generating backlight driving signals for either a cold cathode fluorescent lamp or a LED.

Please refer to FIG. 5, which is a flowchart of a method and process for generating backlight driving signals for either a cold cathode fluorescent lamp or a LED. Based on the signal from the micro controller, the backlight driving signal generator determines whether the backlight unit is connected with a cold cathode fluorescent lamp or a LED. When it is determined that a cold cathode fluorescent lamp is connected, the process moves to right of the flow chart. The backlight driving signal generator then alternates both the first pulse signal and the second pulse signal at a first high-voltage level and a first low-voltage level. When it is determined that a LED is connected, the process moves to left of the flow chart. The backlight driving signal generator then alternates the first pulse signal between a second high-voltage level and a second low-voltage level, and utilizes the second pulse signal as a switching signal.

Accordingly, the present invention provides a backlight driving signal generator used in a liquid crystal display (LCD) controller. The backlight driving signal generator outputs two pulse signals to control the backlight unit according to whether the backlight driving circuit is a driving circuit for cold cathode fluorescent lamps or a driving circuit for light emitting diodes. Therefore, the backlight driving signal generator of the present invention is adapted for both the driving circuit for cold cathode fluorescent lamps and the driving circuit for light emitting diodes.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A backlight driving signal generator for receiving a control signal from a micro controller to control a backlight driving circuit of a liquid crystal display (LCD), the backlight driving signal generator comprising:
    a first pulse width modulation unit for generating a first pulse signal; and
    a second pulse width modulation unit for generating a second pulse signal;
    wherein the backlight driving signal generator transmits the first pulse signal and the second pulse signal to the backlight driving circuit, the backlight driving signal is capable of driving a cold cathode fluorescent lamp when receiving the control signal from said micro controller to alternate both the first pulse signal and the second pulse signal at a first high-voltage level and a first low-voltage level, the backlight driving signal generator is capable of driving a light emitting diode when receiving the control signal from said micro controller to alternate the first pulse signal at a second high-voltage level and a second low-voltage level, and to utilize the second pulse signal as a switching signal; and
    wherein the backlight driving circuit is coupled to a backlight unit, and the backlight unit provides a connection for only cold cathode fluorescent lamp operation or only light emitting diode operation as mutually exclusive light sources.

2. The backlight driving signal generator as recited in claim 1, further comprising a memory unit for storing a control data so as to control the second pulse signal.

3. The backlight driving signal generator as recited in claim 2, wherein the memory unit is a data register.

4. The backlight driving signal generator as recited in claim 1, further comprising a memory unit for storing a control data so as to control the first pulse signal.

5. The backlight driving signal generator as recited in claim 1, wherein the backlight driving signal generator is controlled by a micro-controller.

6. The backlight driving signal generator as recited in claim 5, wherein the micro-controller executes a program code so as to control the backlight driving signal generator.

7. The backlight driving signal generator as recited in claim 1, wherein the second pulse signal is a switching signal for the light-emitting diodes when the backlight driving signal generator is coupled to the driving circuit for the light-emitting diodes.

8. The backlight driving signal generator as recited in claim 1, wherein the backlight driving circuit for driving the cold cathode fluorescent lamp is a push-pull driving circuit.

9. The backlight driving signal generator as recited in claim 1, wherein the backlight driving circuit for driving the cold cathode fluorescent lamp is a full-bridge driving circuit.

10. The backlight driving signal generator as recited in claim 1, wherein the backlight driving circuit for driving the cold cathode fluorescent lamp comprises a voltage transforming circuit.

11. The backlight driving signal generator as recited in claim 1, wherein the driving circuit for the light-emitting diodes comprises a DC-to-DC converter circuit.

12. The backlight driving signal generator as recited in claim 1, wherein the driving circuit for the light-emitting diodes comprises a peak detection circuit for detecting the voltage level of the second pulse signal.

13. The backlight driving signal generator as recited in claim 12, wherein the peak detection circuit comprises a diode coupled in series to a capacitor and a resistor coupled in parallel.

14. The backlight driving signal generator as recited in claim 1, wherein the backlight unit comprises a cold cathode fluorescent lamp.

15. A backlight driving signal generating method for controlling a backlight driving circuit of a liquid crystal display, comprising:
    providing a first pulse signal;
    providing a second pulse signal;
    receiving a control signal;
    setting both the first pulse signal and the second pulse signal to be alternately at a first high-voltage level and a first low-voltage level if the control signal is for driving a cold cathode fluorescent lamp,
    setting the first pulse signal to be alternately at a second high-voltage level and a second low-voltage level, and the second pulse signal to be a switching signal for a light emitting diode if the control signal is for driving the light emitting diode; and
    providing the backlight driving circuit for a connection to the cold cathode fluorescent lamp or the light emitting diode as a mutually exclusive light source.

16. The backlight driving signal generating method as recited in claim 15, wherein the control signal is for driving the cold cathode fluorescent lamp.

* * * * *